(No Model.) 2 Sheets—Sheet 1.
C. E. SCRIBNER.
TEST SYSTEM FOR MULTIPLE SWITCHBOARDS.
No. 483,175. Patented Sept. 27, 1892.
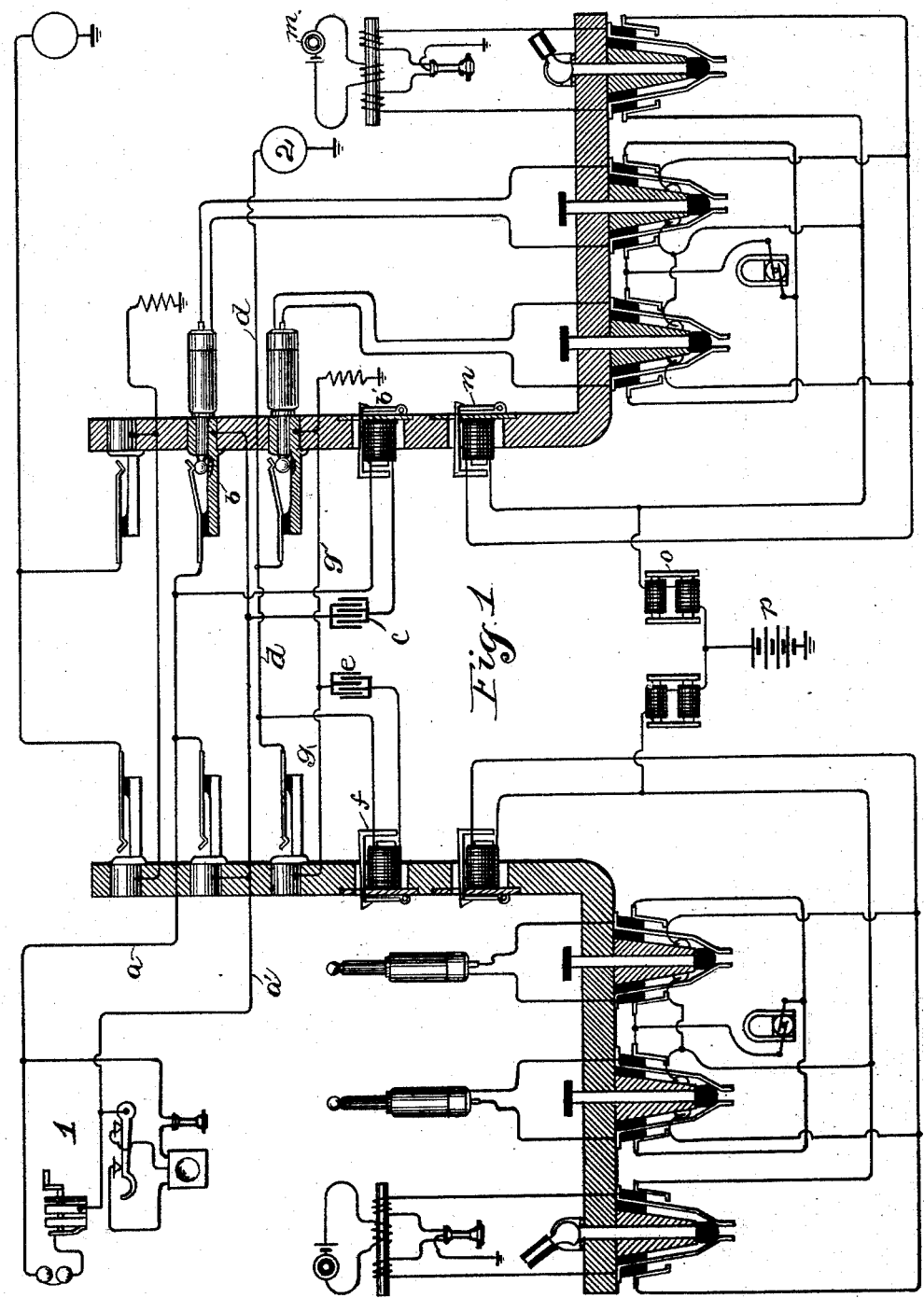
Witnesses:
George L. Cragg
M. J. Tallett.
Inventor:
Charles E. Scribner.
By Barton & Brown
Attys.

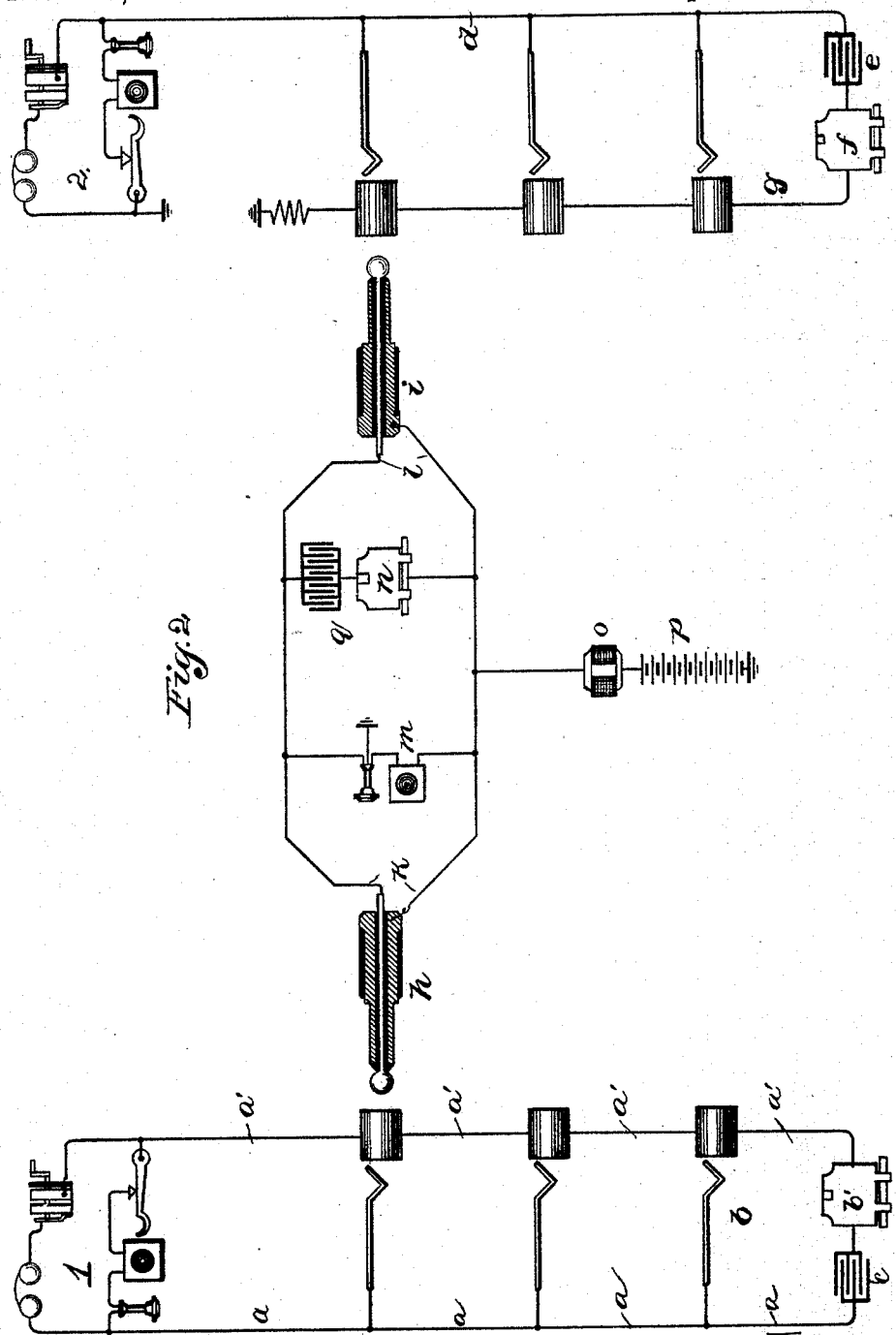

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

TEST SYSTEM FOR MULTIPLE SWITCHBOARDS.

SPECIFICATION forming part of Letters Patent No. 483,175, dated September 27, 1892.

Application filed December 5, 1891. Serial No. 414,134. (No model.)

*To all whom it may concern:*

Be it known that I, CHARLES E. SCRIBNER, a citizen of the United States, residing at Chicago, in the county of Cook and State of Illinois, have invented a certain new and useful Improvement in Test Systems for Multiple Switchboards, (Case No. 282,) of which the following is a full, clear, concise, and exact description, reference being had to the accompanying drawings, forming a part of this specification.

My invention relates to telephone-exchange systems in which multiple switchboards are employed; and its object is to so arrange the circuits that the resistance of the contacts of the several switches will be removed from the circuit of two connected lines, while at the same time individual annunciators of moderate resistance may be employed.

My invention consists more particularly in including a condenser in each circuit in connection with the individual annunciator.

My invention will be more readily understood by reference to the accompanying drawings, in which—

Figure 1 is a diagram illustrative of three telephone-lines, two having metallic circuits and one having a grounded circuit, with two switchboards, with the operator's keyboard and telephone apparatus at each of the boards, the individual annunciator of one of the grounded circuits being omitted for simplicity. Fig. 2, Sheet 2, is a more simple diagrammatic illustration of the circuits of two telephone-lines, one a metallic circuit and the other a grounded circuit, each connected with its series of switches distributed on different switchboards and each including a condenser in circuit with the individual annunciator thereof, the circuit of an operator's outfit being also illustrated.

As is well known, individual annunciators of very high resistance—say three thousand ohms—would be required in connection with the circuit shown if the condensers were omitted, in order that when connection is made with a line the connection through the clearing-out drop, which ordinarily would be of five hundred ohms, may be low enough by comparison to shunt out the individual annunciator of the line with which connection is made.

Referring now to Figs. 1 and 2, station 1 is connected by a metallic circuit by limb $a$ with the springs of the different switches of the line and by limb $a'$ with the metallic frames or tubes of the same switches on the different switchboards. Between the different parts of the switch $b$ on this line of the last board a condenser $c$ is included in circuit with the individual annunciator $b'$. The capacity of the condenser may be, say, one-tenth of a microfarad. The circuit of the line of station 2 extends by the main wire $d$ to the springs of the switches of this line, and after passing the condenser and individual annunciator $e$ $f$ is connected by wire $g$ with the frames or tubes of the same switches of the line on the different switchboards, and thence to ground. The circuits of the operator's outfit, with the plugs $h$ $i$ and cords $k$ $l$, the telephone $m$, the clearing-out annunciator $n$, and with the retardation-coil $o$ and test-battery $p$, are the same heretofore employed.

As before stated, the essential feature of my invention is including a different condenser in the circuit of each of the telephone-lines with each of the individual annunciators thereof, in order that when a line is connected with another line by the operator its individual annunciator may be removed from the circuit by a shunt through the bridge-wire between the cords, including the clearing-out annunciator, so that alternating currents sent over the line from the subscriber's station may not throw down the individual annunciator. In short, the condenser, being included in circuit with the individual annunciator, reduces the conductive capacity of the portion of the circuit including the individual annunciator as compared with the conductive capacity of the bridge-wire, including the clearing-out drop, so that when two lines are connected together their individual annunciators will not be thrown down by operating the generator at either subscriber's station.

I have sometimes included a condenser in the bridge-wire and used a test-battery of very high electro-motive force—say thirty or forty volts. This I have illustrated in Fig.

2, but not in Fig. 1. When the test-battery is small—say three to five volts, as shown in Fig. 1, its current would not be strong enough to operate an individual annunciator of the line upon which it was thrown, even though no condenser should be included in the circuit of the bridge-wire of the clearing-out drop. If, however, the test-battery were of high electro-motive force, as described in connection with Fig. 2, current from the test-battery might be of sufficient strength to operate the individual annunciator if no means were provided for checking the flow of the current across the bridge-wire, including the clearing-out annunciator *n*. For greater caution I preferably employ a test-battery of considerable electro-motive force and place a condenser in the bridge-wire of the clearing-out annunciator.

My invention admits of various modifications, which will readily suggest themselves to those skilled in the art, and I therefore do not limit myself to the details of construction shown.

Having thus described my invention, I claim as new and desire to secure by Letters Patent—

1. The combination, with a telephone-line having one limb or portion thereof permanently connected with the springs of the switches of the line and by the other limb or portion thereof with the frames or test-pieces of the same switches, of a wire permanently connecting said limbs together at the central office, said connecting-wire including a condenser and an individual annunciator.

2. The combination, with a telephone-line extending from the subscriber's station to the central office, of switches upon different switch-boards, each switch being provided with a switch lever and frame insulated from one another, one portion of the telephone-line being permanently connected with the springs of said switches and the other portion being connected with the frames or test-pieces thereof, a wire at the central office connecting the two portions of telephone-line together, and an individual annunciator and a condenser included in said connecting-wire, substantially as and for the purpose specified.

3. The combination, with a telephone-line extending from the subscriber's station to the central office, of switches upon different switch-boards, each switch being provided with a switch lever and frame insulated from one another, one portion of the telephone-line being permanently connected with the springs of said switches and the other portion being connected with the frames or test-pieces thereof, a wire at the central office connecting the two portions of telephone-line together, and an individual annunciator and condenser included in said wire, and switching apparatus consisting of pairs of double-pointed plugs and cords, one strand of said cords (the strand connecting the sleeves thereof) being connected to ground through a retardation-coil and battery, a listening-in key for bridging the telephone between the strands, and a bridge-wire, including a clearing-out annunciator, permanently connected between said strands.

4. The combination, with a telephone-line extending from the subscriber's station to the central office, of switches upon different switch-boards, each switch being provided with a switch lever and frame insulated from one another, one portion of the telephone-line being permanently connected with the springs of said switches and the other portion being connected with the frames or test-pieces thereof, a wire at the central office connecting the two portions of telephone-line together, and an individual annunciator and condenser included in said wire, and switching apparatus consisting of pairs of double-pointed plugs and cords, one strand of said cords (the strand connecting the sleeves thereof) being connected to ground through a retardation-coil and battery, a listening-in key for bridging the telephone between the strands, and a bridge-wire, including a clearing-out annunciator and a condenser, permanently connected between said strands.

In witness whereof I hereunto subscribe my name this 25th day of November, A. D. 1891.

CHARLES E. SCRIBNER.

Witnesses:
GEORGE L. CRAGG,
GEORGE P. BARTON.